March 17, 1925.
R. W. ATKINSON ET AL
1,529,644
CABLE INSTALLATION, METHOD, AND STRUCTURE
Filed Oct. 25, 1924
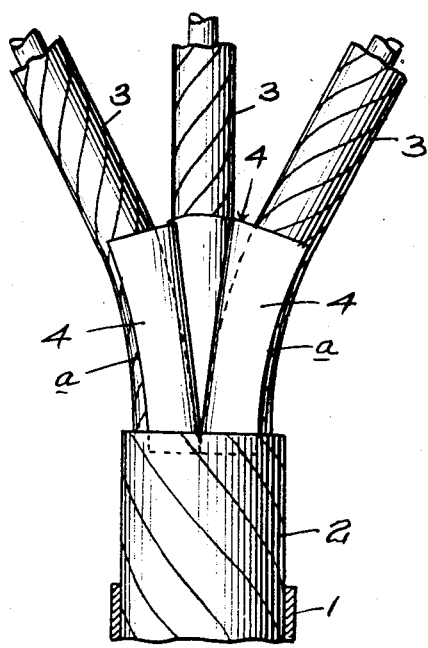
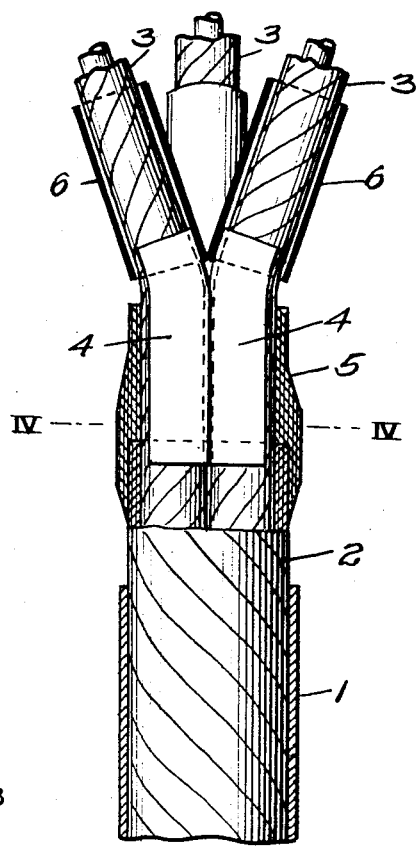
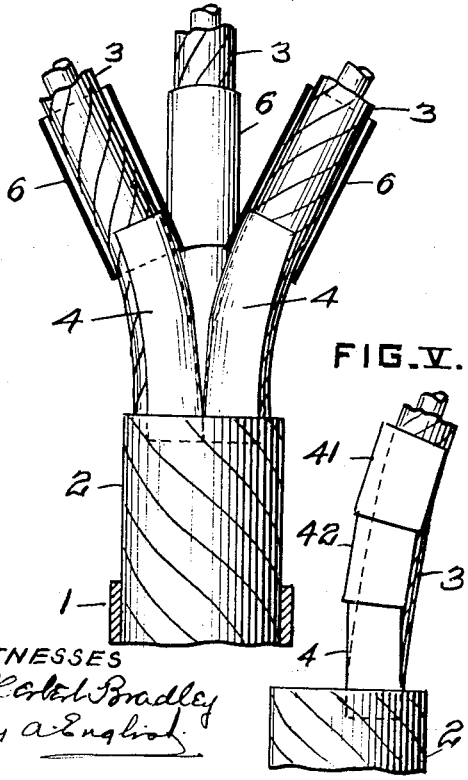
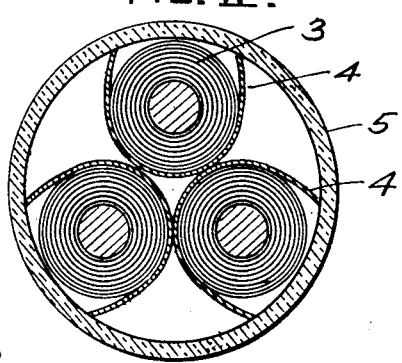
INVENTOR
Ralph W. Atkinson
Alexander M. Myers
by Christy and Christy
their attorneys Patented Mar. 17, 1925.

1,529,644

UNITED STATES PATENT OFFICE.

RALPH W. ATKINSON AND ALEXANDER M. MYERS, OF PERTH AMBOY, NEW JERSEY, ASSIGNORS TO STANDARD UNDERGROUND CABLE COMPANY, OF PITTSBURGH, PENNSYLVANIA, A CORPORATION OF PENNSYLVANIA.

CABLE INSTALLATION, METHOD, AND STRUCTURE.

Application filed October 25, 1924. Serial No. 745,871.

*To all whom it may concern:*

Be it known that we, RALPH W. ATKINSON and ALEXANDER M. MYERS, residing at Perth Amboy, in the county of Middlesex and State of New Jersey, citizens of the United States, have invented or discovered certain new and useful Improvements in Cable Installations, Methods, and Structures, of which improvements the following is a specification.

In making installation of three-conductor electric cables, it frequently becomes necessary to remove the sheath, and, if there be any, the belt insulation also, and to spread apart the individually insulated conductors, which normally lie closely assembled within the cable, in tangency, each to the others. This is necessary particularly at the joints, which in long lines are inevitable, and in terminals. And under other circumstances also it is resorted to—for instance, in preparing the ends of the conductors of such a cable for breakdown test in the laboratory. Such a spreading apart of the conductors brings about a disturbance of the normal conditions of stress to which, when the cable is in service, the insulation is subjected, and if, as commonly is the case, the region of spreading apart be enclosed within a casing, and the casing be filled around the conductors with liquid or viscid insulating compound, the stress which in service is imposed upon this body of compound may, particularly in high-voltage work, be such as to cause breakdown to occur. It is a peculiarity of liquid insulation, used under such circumstances, that, while the stress between divergent conductors decreases as the distance between them widens, the ability of the body of liquid insulation which fills the interval between, to resist breakdown (that is, specific dielectric strength, or dielectric strength in kilovolts per unit thickness), decreases as the distance widens, and decreases more rapidly than the stress decreases. Accordingly, in such an installation, if voltage be applied between conductors of the cable and be gradually increased, a critical point is reached, beyond which voltage may not further be increased, without puncture of the conductor insulation near the base of the crotch where the insulated conductors spread apart. And, accordingly, the crotch formed by the spreading of the conductors is a region of weakness in such installations, and it is to the elimination of this weakness and to raising the prohibitive limit in increase of voltage, that our invention is addressed.

Heretofore, in order to increase the dielectric strength between conductors so spread apart and inundated in oil, and to prevent flashing across, it has been the practice to provide rigid tubes of insulating material encircling the spreading conductors. These tubes being present will in the completed installation serve to break up the body of oil into several layers, and thus to increase very considerably the dielectric strength of this part of the insulation, besides adding somewhat to the dielectric strength, by virtue of the material of which these tubes themselves are formed. But these tubes are necessarily of substantial thickness, and it is impossible to bring them to the very point from which the spreading apart of the conductor springs; accordingly, there has remained, below the lower ends of such applied tubes, an unprotected interval, within which under high voltage, breakdown will occur.

Our invention is illustrated in the accompanying drawing in which Figs. I–III show diagrammatically and in side elevation a portion of a three-conductor electric cable with sheath cut away and conductors spread, and in the successive figures the progress of the operation of making application of our invention is illustrated. Fig. IV is a view in cross section of the finished work, the plane of section being indicated by the line IV—IV, Fig. III. Fig V is a view similar to Fig. I, and illustrating an elaboration in detail.

We provide thin, flexible sheets of solid insulation, such for example as thin sheets of fuller board, impregnated with insulating compound, cut to suitable size. We cut the cable sheath away, and the belt insulation, and spread the conductors, and we then insert into the crotch and apply over the opposite faces of the insulated conductors which spreading apart form the crotch, the so provided thin sheets of insulation. The lower edges of the sheets are advanced downward to the very spring of the crotch, or even beyond, for they may be forced down, below the upper edge of the cut-away body of machine-laid insulation. This initial step in the operation is indicated in Fig. I. The cut-away end of the cable-sheath is indicated at 1, and the so bared but also cut-away end of the belt insulation is indicated at 2. The insulated conductors, spread apart, are indicated at 3.

The three sheets of thin material, applied as we have described, are indicated by the numeral 4, and their general dimensions and initial positions will be sufficiently understood on comparing Figs. I and IV (although, as we have said, Fig. IV shows the cable after our operation has been completely performed upon it). As Fig. I shows, these thin sheets 4 of insulating material are thrust down between the spreading conductors to the very spring of the crotch, and in this instance even beyond that point. In making application of the sheets 4 the bending apart of the insulated conductors need not be, and ordinarily will not be abrupt; the spreading apart is very slight, and the barriers are worked down gradually into the crotch.

We then apply exteriorly by hand-taping, the body of insulation 5 (Fig. III) and in so doing we close together again, for a short but sufficient distance, the spreading conductors. Stated in other words, in wrapping on the body 5 of insulation, we cause the point of spring of the crotch to advance upwardly again, toward the spread-apart ends of the conductors. In doing this, we incorporate the inner or lower ends of the sheets 4 within the cable structure, below the crotch. Thus, in our finished article the sheets of insulation 4 constitute, electrically considered, screens or barriers. They extend well below the region where danger or breakdown is otherwise increased. By their presence they break up or subdivide into thin films or layers the body of oil which otherwise fills the crotch, and by virtue of their own dielectric character, they add to the strength of the structure to resist breakdown. When the procedure just described has been followed through, the structure may be otherwise prepared in usual manner for its intended service. That is to say, the joint or the terminal, or whatever the particular structure may be, is completed as usual.

Having now stated what is the essential feature, it remains for us to explain details and circumstances in the practical application of our invention.

In practice the initial cutting away of the belt insulation and spreading of the individually insulated conductors apart, is carried down to a point lower than otherwise would be the case. In so doing the fillers between the conductors are here retained, and care is exercised, to separate the conductors as little as possible in this region. There is no separation, beyond what is necessary for the insertion of the sheets 4 of insulation.

The taping, to form the constricting and binding body of insulation 5, is preferably done with varnished cambric tape, and in making application of the tape, the free edges $a$ of the sheets 4 may either be wrapped about the conductors 3, or trimmed to lie even, against the inner surface of the applied body 5 of insulation, as shown in Fig. IV. Sufficient tape is applied to extend well down, over the cut-away end of the machine-laid belt insulation 2. The usual space interval at which the cut-away end of the lead-sheath 1 is remote from the cut-away end of the belt insulation 2, is retained, and the usual necessary precautions are taken, to prevent breakdown from the conductor, to the cable-sheath. The hand wrapped body 5 will when applied, and in its effect, be a mere restoration of the machine-laid insulating envelope 2.

Ordinarily single sheets 4 of insulation will not be used as the only screen and barrier between the spreading, individually insulated conductors. We prefer still to make use of the relatively thick-walled tubes of solid insulation, encircling the conductors, which, as we have said, are known to the art. The sheet barrier which we have described, and which and the described use of which constitute our invention, becomes, in this aspect, a supplementary part, curing the defects and insufficiencies of the prior art. Figs. II and III show such tubes 6 in place, encircling the conductors 3. It will be perceived that, when applied, they cannot themselves reach to the spring of the crotch, but it will be perceived that they are effective in the assembly, to accomplish their normal service. The sheets 4 are initially provided of such length that in the assembly the tubes 6 (or equivalent barriers) will overlap them at their upper ends.

We may, in the practice of our invention, employ, not merely single sheets, as illustrated in Fig. I; we may superpose a plurality of sheets, perhaps identical in character, or at least of similar form and physical character and of similar dielectric character. And in using superposed sheets each succeeding sheet will extend toward the crotch a shorter distance than the sheet which underlies it. This is illustrated in Fig. V, where 41 and 42 indicate additional sheets, superposed upon sheet 4 and overlying that face of conductor 3 which opposes the companion conductors. It will be understood that tubes 6 may be applied to the assembly of Fig. V, as well as to that of Fig. I. It is not necessary that the sheets 4 (41, 42) be brought at their ends within tubes 6, though ordinarily they will be. The important thing is that the ends of sheet and tube overlap.

We have specified thin fuller board impregnated with insulating compound as a suitable material for the sheets 4 (41, 42). It is, besides being dielectric, thin, firm, flexible, and easily cut. Other materials, of course, are available; among such we would mention mica and bakelite. These materials which we have mentioned have, all of them, rigidity such as to allow them to be forced down to the spring of the crotch, and even beyond that point and into the very body of the unmutilated cable. In some cases such a forcing down will not be necessary, and then materials otherwise adequate to the ends described, but lacking rigidity, may be used: varnished cambric, for example, or fish paper.

We claim as our invention:

1. In making installation of a multiple-conductor electric cable the method or procedure herein described which consists in cutting away the cable envelope and spreading the individually insulated conductors, introducing a screen of insulating material into the crotch so formed, partially closing the crotch again, upon a portion of the screen so introduced, and filling the space remaining between the spread conductors, and into which the otherwise free end of the screen extends, with insulation of liquid character.

2. In an electric-cable installation the combination of a cable with cut-away envelope and spreading, individually insulated conductors, a screen of insulating material extending from the spring of the crotch formed by and between the spreading conductors, and into the crotch, and a body of insulation of liquid character inundating the spreading conductors and the said screen in the crotch between them.

3. In an electric-cable installation the combination of a cable with cut-away envelope and spreading, individually insulated conductors, screens, of insulating material extending from the spring of the crotch formed by and between the spreading conductors, and into the crotch, and overlying the inner faces of the conductors, ring-shaped barriers of insulating material encircling the spreading conductors and overlying the outer ends of said screens, and a body of insulation of liquid character inundating the spreading conductors the screens and the ring-shaped barriers.

4. In an electric-cable installation the combination of a cable with cut-away envelope and spreading, individually insulated conductors, screens of insulating material extending from the spring of the crotch formed by and between the spreading conductors, and into the crotch, and overlying the inner faces of the conductors, supplemental screens overlying the first-named screens and reaching to less distance inward toward the spring of the crotch, and a body of insulation of liquid character filling the crotch and inundating the spreading conductors and the screens.

In testimony whereof we have hereunto set our hands.

RALPH W. ATKINSON.
ALEXANDER M. MYERS.

Witnesses to Atkinson:
   Leslie D. Kuhn,
   Anna Cooper.

Witnesses to Myers:
   D. W. Simons,
   F. L. Rex.